(12) United States Patent
Tokuyama

(10) Patent No.: US 6,229,286 B1
(45) Date of Patent: May 8, 2001

(54) CHARGING CONTROLLER

(75) Inventor: Hiroshi Tokuyama, Kyoto (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/566,445

(22) Filed: May 8, 2000

(30) Foreign Application Priority Data

May 14, 1999 (JP) ................................................. 11-134715

(51) Int. Cl.[7] ....................................................... H02J 7/00
(52) U.S. Cl. ........................... 320/132; 320/160; 320/162
(58) Field of Search .................................... 320/132, 134, 320/136, 162, 160; 324/426

(56) References Cited

U.S. PATENT DOCUMENTS 5,254,951 * 10/1993 Goto et al. ............................ 324/426
5,963,015 * 10/1999 Lee ........................................ 320/128

FOREIGN PATENT DOCUMENTS 5-137276 * 6/1993 (JP) ........................................ 320/136

* cited by examiner

Primary Examiner—Peter S. Wong
Assistant Examiner—Gregory J. Toatley, Jr.
(74) Attorney, Agent, or Firm—Ostrolenk, Faber, Gerb & Soffen, LLP

(57) ABSTRACT

A charging controller for charging a secondary battery by a dc source has a consumption current detector detecting a consumption current of a load; a charging current detector detecting a charging current to the secondary battery; a charging voltage detector detecting a charging voltage to the secondary battery, a function-processor to which detection outputs from the consumption current detector, the charging current detector, and the charging voltage detector are provided, respectively, and a charging control circuit controlling a charging output to the secondary battery, based on calculation results by the function-processor such that driving the load and charging are simultaneously executed within the ratings of the dc source.

6 Claims, 8 Drawing Sheets

CHARGING CONTROLLER

BACKGROUND OF THE INVENTION

1. Cross Reference to Related Application

This application is one of four related applications, Ser. Nos. 09/566,445, 09/566,930, 09/568,720 and 09/569,938.

2. Field of the Invention

The present invention relates to a charging controller, and more particularly to a charging controller for charging a secondary battery used in a portable electronic device, for example.

3. Description of the Related Art

Portable electronic devices such as a notebook-sized computer, and so forth contain a secondary battery. As to a charging controller for driving a unit and charging the secondary battery simultaneously, the following techniques have been disclosed.

According to a first technique, the rating of output power from a dc source is designed so as to be not less than the sum of the maximum consumption power of a unit and maximum charging power.

According to a second technique, as described in Japanese Unexamined Patent Publication No. 5-137276, only a unit load current is detected, the difference between the rated current of a dc source and the unit load current is determined, and a charging output is controlled so that the charging current is equal to the difference.

According to a third technique, as described in U.S. Pat. No. 5,723,970, an output current from a dc source is detected, and a charging output is controlled so that the output current from the dc source is prevented from exceeding the rated current.

Generally, a portable electronic device can be driven by application of power which is considerably lower than the maximum consumption power, and the time period while the device is required to be driven by application of the maximum consumption power is very short. FIG. 5 shows the operation conceptual diagram. In FIG. 5, the maximum power required to drive the unit is 30 W, and the maximum charging power is 30 W. Accordingly, the supply capability of the dc source is 60 W. However, since the power required to drive the device is changed with time, a large part of the power supply capability of the dc power is surplus.

For this reason, regarding the above-described first technique of the conventional example, it is needed that the power supply capability of the dc source is designed so as to be surplus to a unit consumption power required under ordinary operation. Thus, there arises the problem that the shape and size and the cost of the dc source are increased.

In the above-described second technique of the conventional example, the charging output is controlled so that the rated current of the dc source is not exceeded. Therefore, the maximum supply power of the dc source can be reduced to the maximum consumption power of the unit. However, since the charging current is kept constant, irrespective of the charging voltage, the surplus power of the dc source can not effectively be used.

FIG. 6 illustrates the relation between the charging voltage and the charging current, obtained in the second technique of the conventional example. The rated power of the dc source is 20V/1.5 A (30 w), the unit current draw is 1.2 A, and the charging voltage range is 9.0–13.0V.

FIG. 7 shows an output power characteristic. According to the second technique of the conventional example, the charging current is kept constant, irrespective of the charging voltage as described above. However, the power available for charging (20 W×1.5–20 W ×1.2=6 W) is constant, as shown in FIG. 7. Accordingly, if the charging is carried out in this technique, the power supply capability of the dc source becomes surplus when the charging voltage is low.

Accordingly, in the second technique of the conventional example, the power supply capability of the dc source can not effectively be used. Thus, there arises the problem that the charging time is increased, in spite of the power supply capability of the dc source.

FIG. 8 is a circuit block diagram of a charging controller which employs the above described third technique of the conventional example. In FIG. 8, an output 15 from a dc source 1 is provided to a charging control circuit 2 via a dc source output current detection resistor 5 of a charging circuit 14, and also provided to a DC-DC converter 6 via a rectification element 13. The input 17 of the DC-DC converter 6 is connected to the anode of a secondary battery 4 via a rectification element 12. The output 18 of the DC-DC converter is connected to a unit load 7 of a portable device.

A voltage developed across the dc source output current detection resistor 5 is detected by a dc source output current detection circuit 10, and the detection signal 21 is provided to a control circuit 2 of the charging controller. The output of the charging control circuit 2 is connected to the anode of the secondary battery 4 via a charging current detection resistor 3. A voltage developed across the charging current detection resistor 3 is detected by a charging current detection circuit 8, and the detection signal 19 is provided to the charging control circuit 2. A charging voltage on the anode side of the secondary battery 4 is detected by a charging voltage detection circuit 9, and the detection signal 20 is also provided to the charging control circuit 2.

Next, the operation of the charging circuit 14 shown in FIG. 8 will be described. In the case of charging while the unit stops, a voltage developed across the charging current detection resistor 3 is detected by the charging current detection circuit 8. The charging voltage detection circuit 9 detects a charging voltage on the anode side of the secondary battery 4. The output 19 from the charging current detection circuit 8 and the output 20 from the charging voltage detection circuit 9 are fed back to the charging control circuit 2, whereby constant-voltage, constant-current charge is carried out.

When the unit is under operation, a voltage developed across the dc source output current detection resistor 5 is detected by a dc source output current detection circuit 10, and the detection output 21 is fed back to the charging control circuit 2, whereby the charging output is controlled so that the output current from the dc source 1 is prevented from exceeding a predetermined value.

With the charging controller shown in FIG. 8, the surplus power determined by subtracting a practical unit consumption power from the current supply capability of the dc source 1 can be utilized as charging output power, without any surplus or shortage. Accordingly, the charging time of the secondary battery 4 can be reduced.

However, it is needed that all of the current required for driving the unit and charging is made to flow through the dc source output current detection resistor 5 for detecting the output current from the dc source 1. Therefore, a loss and heat generated in the dc source output current detection resistor 5 are increased, the reliability of the circuit is reduced, and the current detection accuracy deteriorates, caused by effects on the temperature characteristic of the dc source output current detection resistor 5. Moreover, it is needed to take heat dissipation measures such as attachment of a radiation plate, which causes the problem that the shape and size, and the cost of the charging circuit are increased.

SUMMARY OF THE INVENTION

The present invention can solve the aforementioned problem associated with the conventional art and provides a charging controller which can reduce maximum charging power and charging time, and can reduce a loss generated in the current detection resistor.

The charging controller for charging a secondary battery from a dc source comprises a consumption current detector detecting a consumption current of a load, a charging current detector detecting a charging current to the secondary battery, a charging voltage detector detecting a charging voltage to the secondary battery, a function-processor to which detection outputs from the consumption current detector, the charging current detector, and the charging voltage detector are provided, respectively, and a charging control circuit controlling a charging output to the secondary battery, based on the calculation results by the function-processor such that driving the load and the charging are simultaneously executed within the ratings of the dc source.

The function-processor may calculate a function of the consumption current, based on the detection output from the consumption current detector, calculates a function of the charging current based on the detection output from the charging current detector, and calculates a function of the charging voltage, based on the detection output from the charging voltage detector, and calculates the sum of the three calculated functions as the output rating of the dc source, and the charging control circuit controls the charging output to the secondary battery so that the output rating of the dc source, calculated by the function-processor, is prevented from exceeding a predetermined value.

The function-processor may include at least one operational amplifier to calculate the function of the consumption current, the function of the charging current, and the function of the charging voltage.

According to the present invention, the load consumption current, the charging current to the secondary battery, and the charging voltage to the secondary battery are detected, respectively. By controlling the charging output to the secondary battery, based on the detection results, by use of the function-processor, driving the load and charging the secondary battery can be simultaneously carried out within the ratings of the dc source, the loss in the resistor for detecting the consumption current can be suppressed, and reduction of the reliability of the circuit and the current detection accuracy, caused by effects on the temperature characteristic of the current detection resistor is eliminated. No heat radiation/dissipation measures such as attachment of a heat radiation plate or the like are needed. The size and shape and the cost of the charging controller can be reduced.

For the purpose of illustrating the invention, there is shown in the drawings several forms which are presently preferred, it being understood, however, that the invention is not limited to the precise arrangements and instrumentalities shown.

BRIEF DESCRIPTION OF THE DRAWING(S)

DETAILED DESCRIPTION OF EMBODIMENTS OF THE INVENTION

Hereinafter, the preferred embodiments of the present invention are explained in detail with reference to the drawings.

Figure 1:
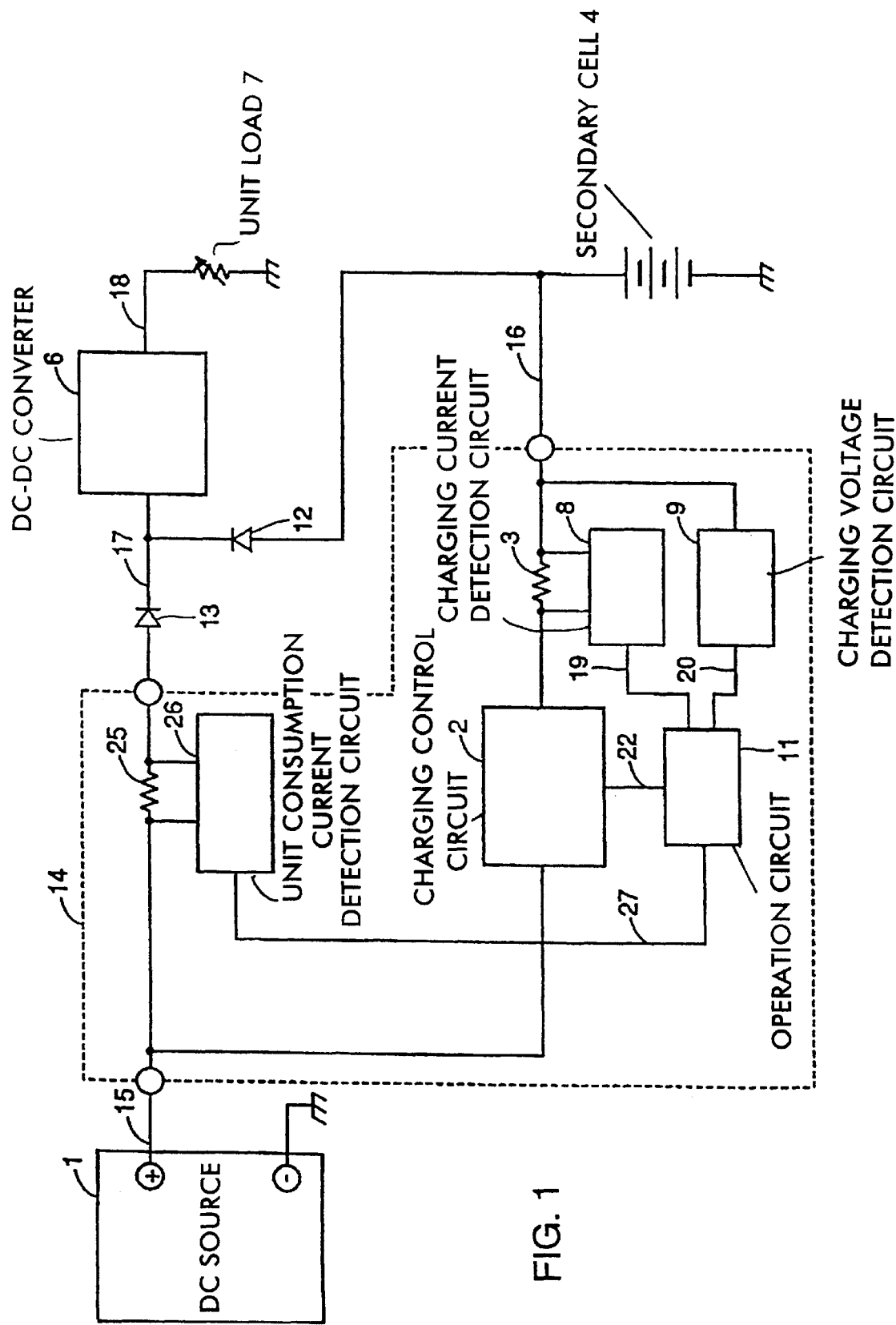
FIG. 1 is a block diagram of a charging controller according to an embodiment of the present invention.

FIG. 1 is a block diagram of an embodiment of the present invention. In FIG. 1, parts which are configured differently from the configuration shown in FIG. 8 will be described. In this embodiment, a unit consumption current detection resistor 25 is provided instead of the dc source output current detection circuit 5 shown in FIG. 8, a unit consumption current detection resistor 26 is provided instead of the dc source output current detection circuit 10, and an operation circuit 11 is provided. To the operation circuit 11, a detection output 19 from a charging current detection circuit 8, a detection output 20 from a charging voltage detection circuit 9, and a detection output 27 from the unit consumption current detection circuit 26 are provided. The operation circuit 11, based on these detection outputs, calculates the charging power and the output power from a dc source 1. The calculation result 22 is provided to a charging control circuit 2. The charging control circuit 2 controls a charging output to a secondary cell 4 so that the output power from the dc source 1 is prevented from exceeding a predetermined value.

Next, the operation of the charging controller shown in FIG. 1 will be described. The charging controller has the configuration in which the output 15 of the dc source 1 and the anode 16 of the secondary cell 4 are wired OR connected through rectification elements 13 and 12, respectively, and the output power from the dc source 1 or the secondary cell 4 is converted to a voltage required for a unit load 7 by means of a DC-DC converter 6 for operation of the unit.

The dc source 1 has a function of stabilizing the output at a predetermined voltage Vin to output. The rated power is represented by Pinmax. In the charging current detection resistor 3, a voltage is developed, which is defined as $$Rc \cdot Ic \qquad (1)$$

in which Rc represents the resistance of the charging current detection resistor 3, and Ic a charging current. The charging current detection circuit 8 detects the Rc·Ic, and provides an output corresponding to the Rc·Ic to the operation circuit 11. A charging voltage Vc is detected by the charging voltage detection circuit 9, and an output corresponding to the charging voltage Vc is provided to the operation circuit 11.

In the unit consumption current detection resistor 25, a voltage is developed, which is defined as $$Rs \cdot Is \qquad (2)$$

in which Rs represents the resistance of the unit consumption current detection resistor 25, and Is a unit consumption current Is. The unit consumption current detection circuit 26 detects the Rs•Is, and an output 27 corresponding to the Rs•Is is provided to the operation circuit 11.

The output power Pin of the dc source 1 can be expressed by the following equation (3) in which Ps represents the consumption power of the unit, and Pc the charging power.

$$Pin=Ps+Pc \quad (3)$$

Here, the Ps and Pc can be expressed as follows, by using the unit consumption current Is, a dc source output voltage Vin, the charging current Ic, and the charging voltage Vc.

$$Ps=Is•Vin \quad (4)$$

$$PC=IC•Vc \quad (5)$$

Thus, equation (3) can be expressed as $$Pin=Is•Vin+Ic•Vc \quad (6)$$

The Is represents the unit consumption current which changes successively, caused by the operation conditions of the unit. Further, Vc represents a voltage at the anode of the secondary cell 4, is stabilized, and is gradually increased as the charging of the secondary cell 4 progresses. The Vin represents the output voltage from the dc source 1, and hence, can be considered to be constant.

As shown in the above-description, the output power Pin from the dc source 1 can be kept constant by controlling the charging current Ic, correspondingly to the unit consumption current Is and the charging voltage Vc. Accordingly, the output rated-power from the dc source 1 can be divided for the charging output and driving the electronic unit, without any surplus of the power, by controlling so as to satisfy the following equation, $$Pinmax=Is•Vin+Ic•Vc \quad (7),$$

in which Pin of equation (6) is replaced by the rated power Pinmax of the dc source 1, whatever values the Is and the Vc may have (that is, whatever values the consumption current of the unit and the charging voltage may have) in the range of $$Pinmax>Ps \quad (8)$$

As regards equation (6), it is necessary to calculate the product of the charging power Ic and the charging voltage Vc. However, generally, it is very difficult to realize the cost-reduction and the highly-enhanced precision of a multiplication integration circuit for two variables, since the circuit scale is large, and the temperature stability is low.

In the charging circuit 14, the ranges of the charging voltage and the charging current are limited by the secondary cell 4. In equation (6), the charging voltage and the charging current have an inversely proportional relation. The characteristic of the charging voltage versus the charging current is depicted by a hyperbola. However, in the practical-use range thereof, the charging voltage range is limited, so that the characteristic can be approximated with a straight line.

In this embodiment, the product of the charging voltage and the charging current is not calculated. The characteristic of the charging voltage and the charging current is approximated by a straight line by use of the linear function values of the charging voltage and the charging current. That is, pseudo-constant power control is carried out by controlling so that $$Pinmax=\alpha•Is+\beta•Ic+\gamma•Vc \quad (9)$$

holds. In the equation (9), $\alpha$, $\beta$, $\gamma$ and represent arbitrary real numbers.

Figure 2:
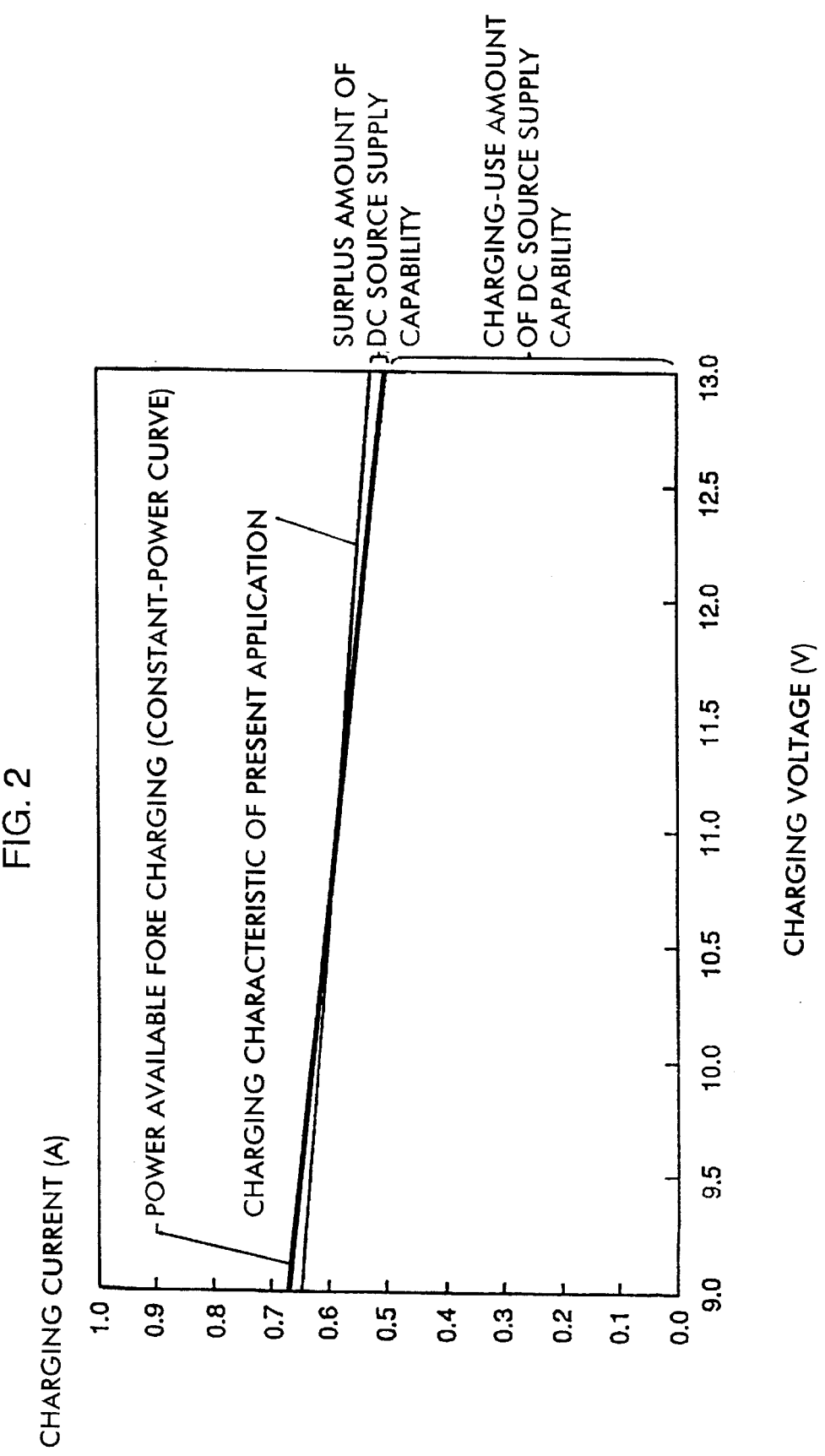
FIG. 2 is an operation conceptual diagram of the charging controller shown in FIG. 1.
Figure 3:
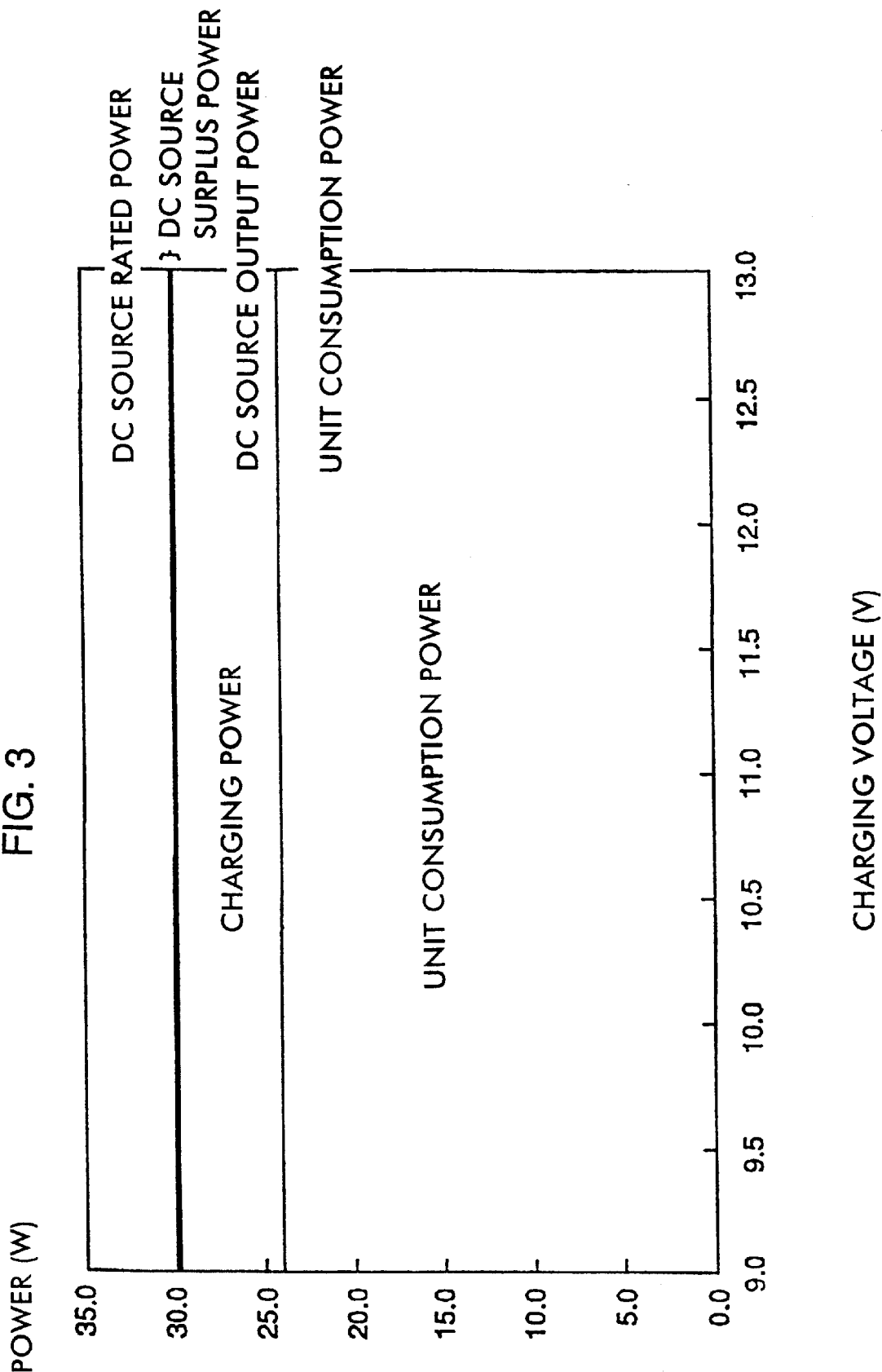
FIG. 3 illustrates the output power characteristic of an embodiment of the present invention.

FIG. 2 shows the charging characteristic in this embodiment, and FIG. 3 the output power characteristic of the dc source.

In FIGS. 2 and 3, the power supply capability of the dc source is 20V/1.5 A, the unit current draw is 1.2 A, and the charging voltage range is 9–13.0V. In this case, the power available for charging is 20×1.5−20×1.2=6 W.

As seen in FIG. 2, the power available for charging can be depicted by a hyperbola. As seen in FIG. 3, the power available for charging can be utilized most effectively in the used charging voltage range, even when the characteristic is approximated with a linear function as in this embodiment. Further, in contrast to a multiplication circuit for two variables, a multiplication circuit for one variable can be realized at high precision and stability, and is advantageous in reliability and cost reduction.

The operation circuit 11 executes calculation corresponding to the above-described equation (9). Accordingly, the charging current can be controlled without any surplus or shortage in the output rated-power of the dc source 1 by feeding back the output corresponding to the charging current determined according to equation (7), to the charging control circuit 2.

The charging current detection circuit 8, the charging voltage detection circuit 9, and the unit consumption current detection circuit 26 each can be formed of an operational amplifier circuit.

Figure 4:
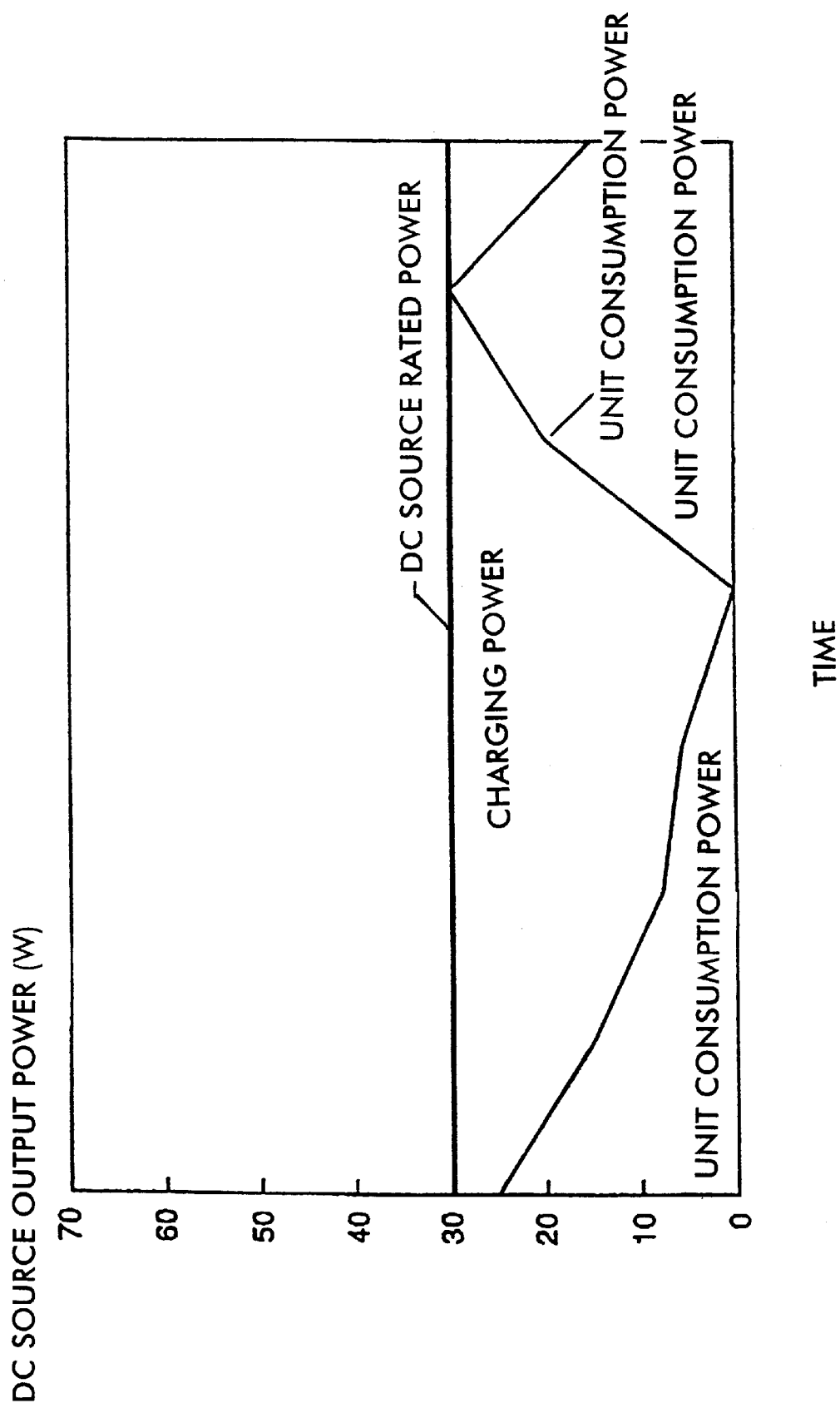
FIG. 4 is an operation conceptual diagram of an embodiment of the present invention.
Figure 5:
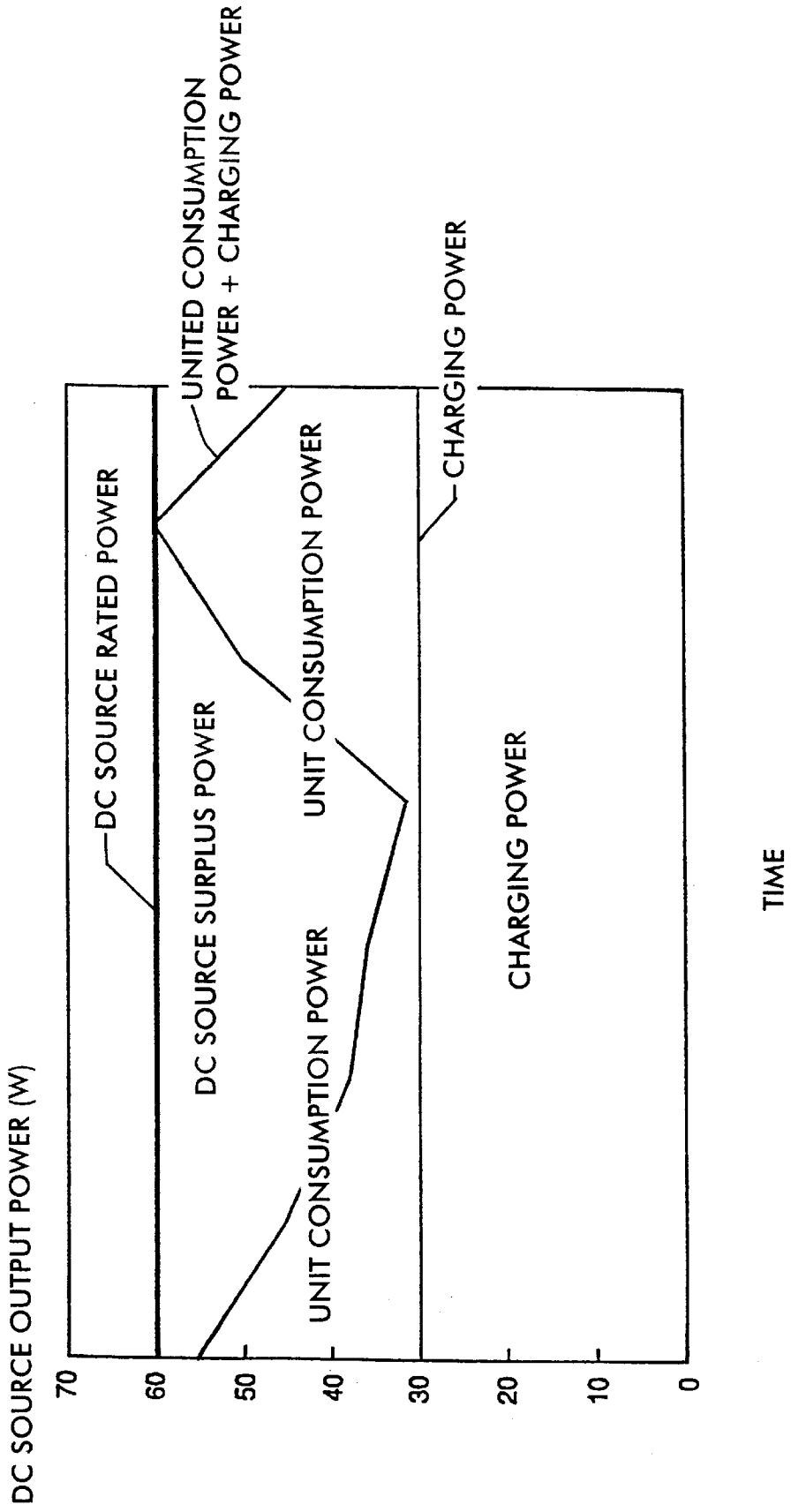
FIG. 5 is an operation conceptual diagram of a first technique of a conventional example.
Figure 6:
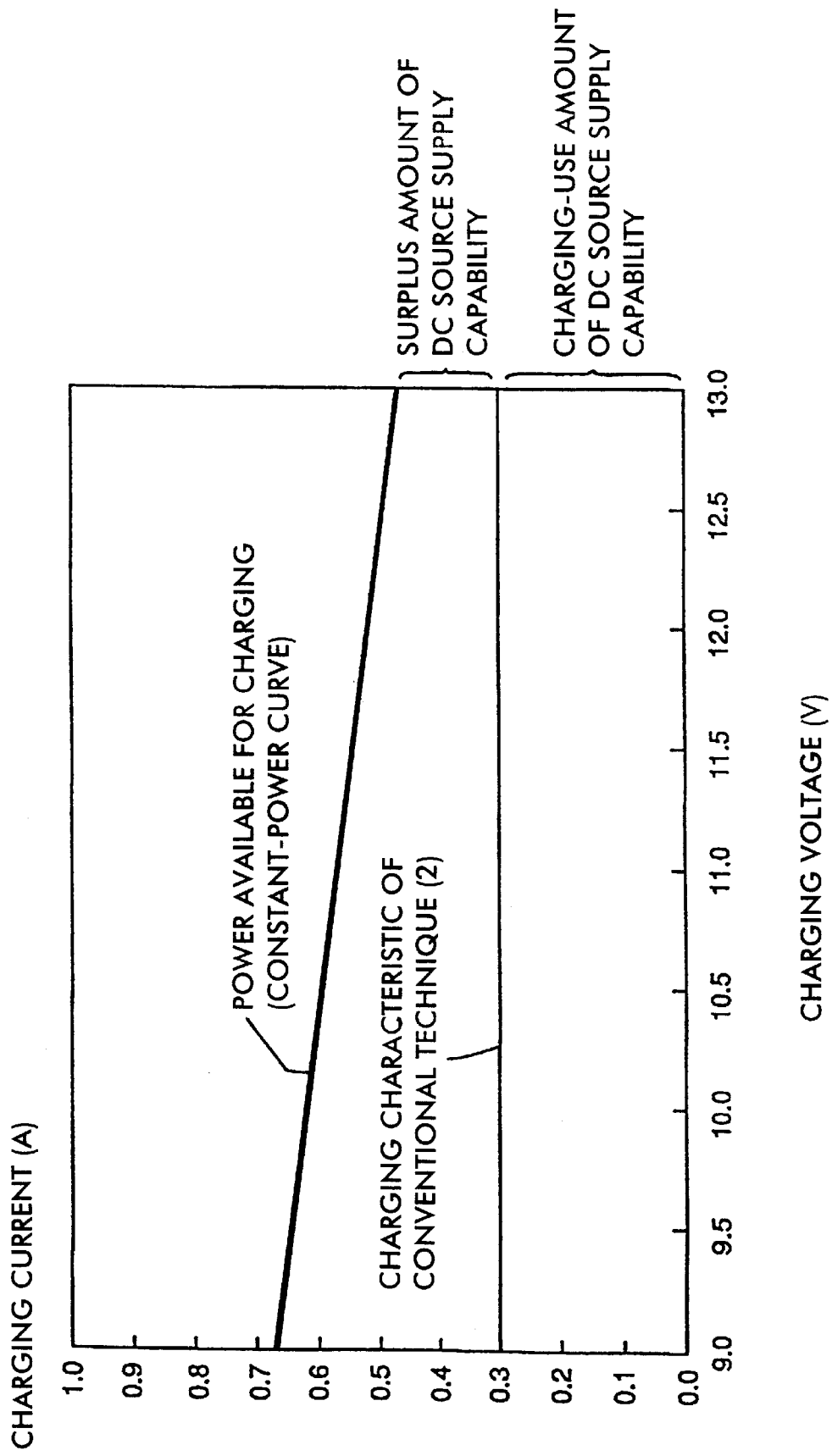
FIG. 6 illustrates the charging characteristic of the second technique of the conventional example.
Figure 7:
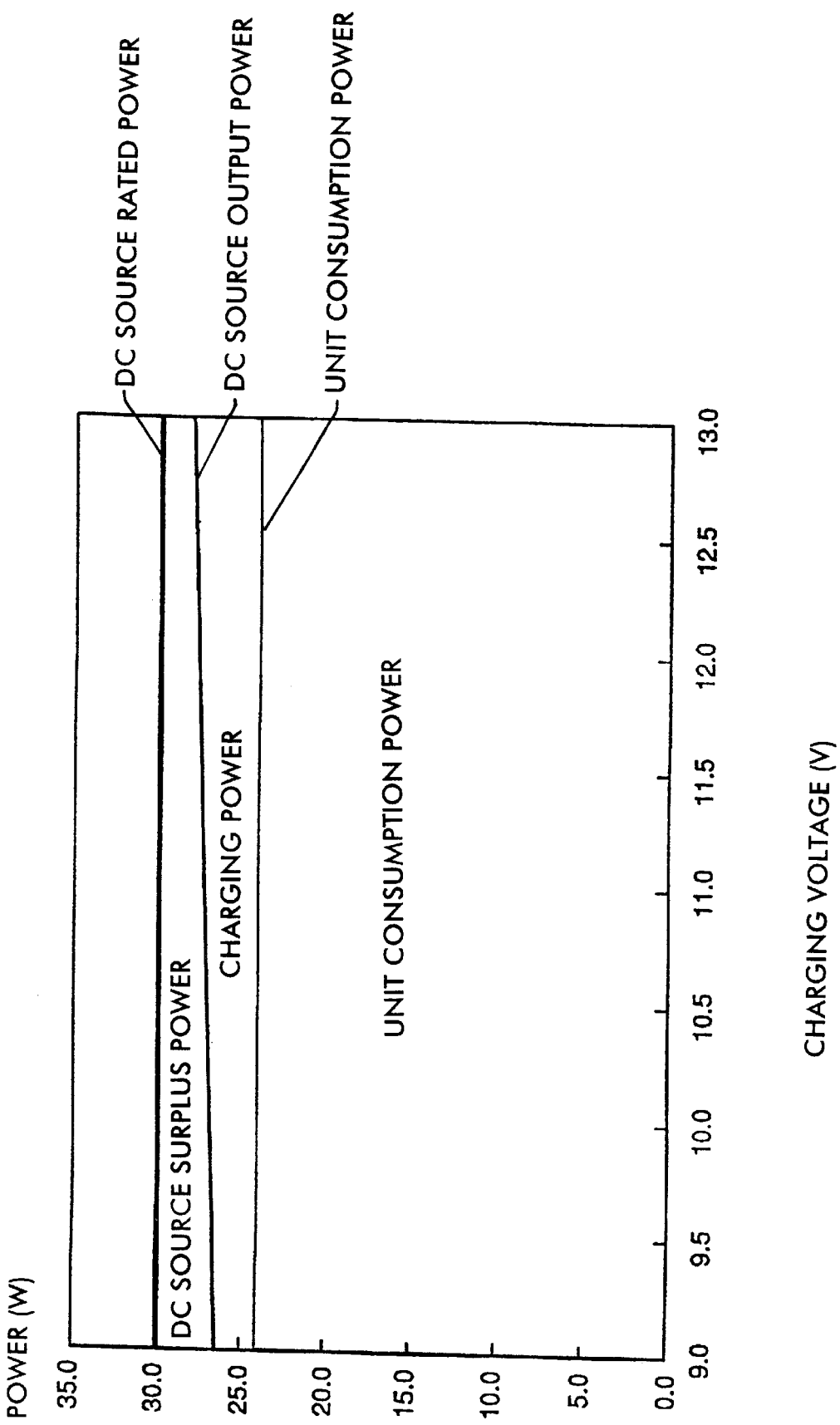
FIG. 7 illustrates the output power characteristic of the second technique of the present invention.

FIG. 4 is an operational conceptual diagram of an embodiment of the present invention. As described above, charging and driving the unit can be simultaneously carried out by executing the calculation equivalent to equation (9) in the operation circuit 11 for charging control, on condition that the output rated-power of the dc source 1 is not less than the maximum consumption power of the unit, as shown in FIG. 4. Accordingly, in contrast to the method of designing so that the output power rating of the dc source 1 is not less than the sum of the maximum consumption power of the unit and maximum charging power, as stated in reference to the first technique of the conventional example, the charging maximum power can be reduced. Therefore, the shape and size, the weight, and the cost of the dc source 1 can be considerably reduced.

Further, according to the second technique of the conventional example, even when the charging voltage is low, the charging is carried out by application of the charging current of which the value is obtained by subtracting the unit consumption current from the output current from the dc source 1. In this embodiment, as seen in equation (9), even when the charging voltage is low, the charging current is increased correspondingly to the low charging voltage. Accordingly, as compared with the conventional second technique, the charging time of the secondary cell 4 can be reduced.

Further, in this embodiment, the unit consumption current is small as compared with the output current from the dc source 1. Therefore, the loss generated in the current detection resistor can be reduced, as compared with that generated in the conventional third technique in which the output current from the dc source 1 is monitored.

In the case that the operation of an electronic device and charging are simultaneously carried out, the loss generated in the unit consumption detection resistor 25, caused by the flow of the maximum supply current Iinmax of the dc source 1, is defined as $$Iinmax^2•Rin \quad (10)$$

in which Rin represents the resistance of the unit consumption current detection resistor 25. Hereupon, the loss defined by equation (10) is invariably constant, irrespective of the charge current in the unit. According to the configuration of this embodiment, the loss defined as $$Is^2 \cdot Rs \quad (11)$$

is generated, caused by the current Is flowing in the unit consumption current detection resistor 25. Further, $$Iinmax \geq Is$$

holds invariably, and therefore, when the maximum values of voltage developed across the current detection resistor are the same, the following equation holds.

$$Rs = Rin \quad (12)$$

Accordingly, the loss generated in the current detection resistor can be expressed as follows, based on equations (10), (11), and (12). It is understood that the loss of the conventional example shown in FIG. 8 is larger than that of the embodiment shown in FIG. 1.

$$Iinmax^2 \cdot Rin - Is^2 \cdot Rs = Iinmax^2 \cdot Rin - Is^2 \cdot Rin = (Iinmax^2 - Is^2) \cdot Rin > 0$$

Figure 8:
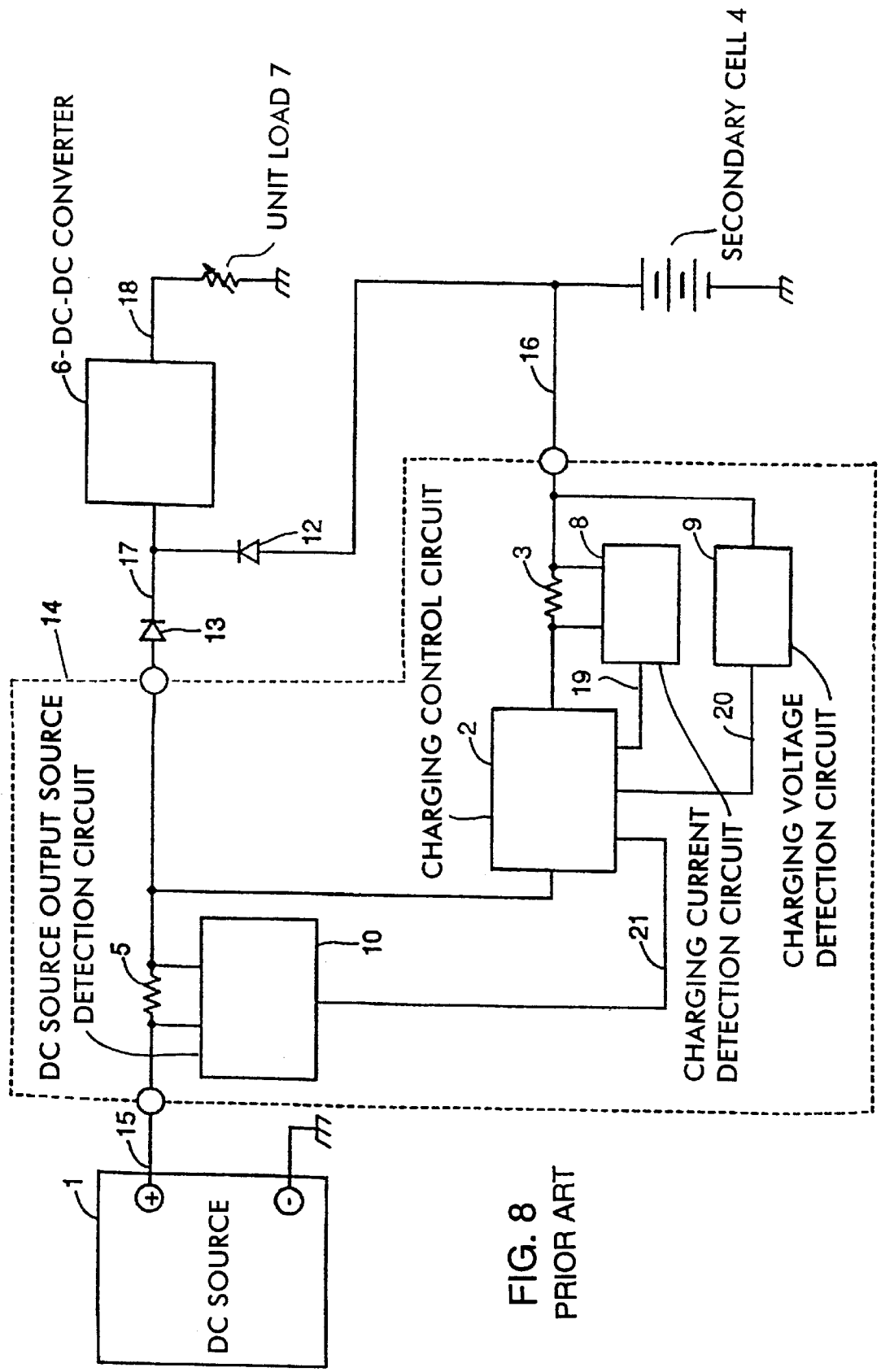
FIG. 8 is a circuit block diagram of a charging controller according to a third technique of the conventional example.

If the average value of the unit consumption current is half of the maximum supply current of the dc source 1, for example, the loss generated in the unit consumption current detection resistor 25 is one-quarter of the loss in the dc source output current detection resistor 5 shown in FIG. 8.

It should be understood that the embodiments disclosed here are illustrative and not restrictive. The scope of the present invention is defined by the appended claims rather than by the above description, and is intended to include meanings equivalent to the claims and all changes without departing from the claims.

What is claimed is:

1. A charging controller for charging a secondary battery from a dc source, the dc source having an electrical rating, the charging controller comprising:

a consumption current detector detecting a consumption current of a load, a charging current detector detecting a charging current to the secondary battery, a charging voltage detector detecting a charging voltage to the secondary battery, a function-processor to which detection outputs from the consumption current detector, the charging current detector and the charging voltage detector are provided, respectively, and a charging control circuit controlling a charging output to the secondary battery, based on calculation results by the function-processor such that driving the load and charging are simultaneously executed within the rating of the dc source.

2. The charging controller of claim 1, wherein the function-processor:

calculates a function of the consumption current, based on the detection output from the consumption current detector, calculates a function of the charging current based on the detection output from the charging current detector, calculates a function of the charging voltage, based on the detection output from the charging voltage detector, and calculates a sum of the above calculated three functions as an output rating of the dc source, and said charging controller controls the charging output to the secondary battery so that the output rating of the dc source, calculated by the function-processor, is prevented from exceeding a predetermined value.

3. The charging controller of claim 2, wherein the function-processor includes at least one operational amplifier to calculate the function of the consumption current, the function of the charging current and the function of the charging voltage.

4. The charging controller of claim 1, wherein the charging current detector includes a charging current detection resistor supplying current to said secondary battery.

5. The charging controller of claim 1, wherein the consumption current detector includes a consumption current detection resistor supplying current to the load.

6. The charging controller of claim 1, wherein the function processor comprises an operation circuit for calculating a charging current according to the equation:

$$Pinmax = \alpha \cdot Is + \beta \cdot Ic + \gamma \cdot Vc$$

where Pinmax is the rated power of the dc source, Is is the unit consumption current, Ic is the charging current and $\alpha$, $\beta$, and $\gamma$ are constants, the output corresponding to the charging current being provided to the charging control circuit of the charging controller of claim 2, wherein the predetermined value is a sum o the power consumed by the load and the power consumed by the secondary battery to control the charging current.

* * * * *